US010320699B1

(12) United States Patent
Sandham (10) Patent No.: US 10,320,699 B1
(45) Date of Patent: Jun. 11, 2019

(54) COMPUTER IMPLEMENTED SYSTEM AND METHOD, AND A COMPUTER PROGRAM PRODUCT, FOR ALLOCATING VIRTUALIZED RESOURCES ACROSS AN ENTERPRISE

(71) Applicant: VCE Company, LLC, Richardson, TX (US)

(72) Inventor: Adrian J Sandham, Cork (IE)

(73) Assignee: VCE IP Holding Company LLC., Richardson, TX (US)

( * ) Notice: Subject to any disclaimer, the term of this patent is extended or adjusted under 35 U.S.C. 154(b) by 293 days.

(21) Appl. No.: 14/919,789

(22) Filed: Oct. 22, 2015

(51) Int. Cl.
*G06F 15/173* (2006.01)
*H04L 12/911* (2013.01)
*H04L 12/46* (2006.01)

(52) U.S. Cl.
CPC .......... *H04L 47/70* (2013.01); *H04L 12/4641* (2013.01)

(58) Field of Classification Search
CPC ............................ H04L 47/70; H04L 12/4641
See application file for complete search history.

(56) References Cited

U.S. PATENT DOCUMENTS

| | | | |
|---|---|---|---|
| 2007/0233698 A1* | 10/2007 | Sundar | G06F 8/60 |
| 2012/0166323 A1* | 6/2012 | Guo | G06Q 30/04 |
| | | | 705/34 |
| 2012/0260019 A1* | 10/2012 | Malaiyandisamy | G06F 9/5077 |
| | | | 711/6 |
| 2013/0297902 A1* | 11/2013 | Collins | G06F 3/0605 |
| | | | 711/163 |
| 2017/0083367 A1* | 3/2017 | Chen | G06F 9/485 |

* cited by examiner

*Primary Examiner* — John B Walsh
(74) *Attorney, Agent, or Firm* — Womble Bond Dickinson (US) LLP (57) ABSTRACT

A computer implemented system and method, and a computer program product, for allocating virtualized information technology resources across an enterprise. For example, a method may include accessing hierarchical enterprise information, which is information identifying a plurality of hierarchically arranged organizational units of the enterprise. The method accesses virtualized resource information, which is information identifying virtualized resource available to the enterprise. The method also accesses virtualized resource allocation information, which is information identifying one or more of the plurality of hierarchically arranged organizational units and information identifying one or more virtualized resources allocated to each of the identified one or more of the plurality of hierarchically arranged organizational units. The method may receive a virtualized resources request from one of the plurality of hierarchically arranged organizational units, which identifies one or more virtualized resources requested by the one of the plurality of hierarchically arranged organizational units. Responsive to receiving the virtualized resources request, the method determines whether provisioning each of the virtualized resources identified in the virtualized resources request does not exceed the virtualized resources allocated to the one of the plurality of hierarchically arranged organizational units from which the virtualized resource request was received. If not, the method causes the provisioning each of the virtualized resources identified in the virtualized resources request to the one of the plurality of hierarchically arranged organizational units from which the virtualized resource request was received.

20 Claims, 7 Drawing Sheets

COMPUTER IMPLEMENTED SYSTEM AND METHOD, AND A COMPUTER PROGRAM PRODUCT, FOR ALLOCATING VIRTUALIZED RESOURCES ACROSS AN ENTERPRISE

FIELD OF THE DISCLOSURE

Aspects of the disclosure relate to computing technology and, more particularly, to a computer implemented system and method, and a computer program product, for allocating virtualized information technology resources across an enterprise.

BACKGROUND

In today's corporate or enterprise environments, every functional department has its own requirements for information technology (IT) resources in order for that department to function effectively. Allocating physical IT resources is relatively easily managed by providing the functional department the required physical IT resources needed to operate. Some IT resources may be shared among multiple departments as part of a common infrastructure. For all other departmental IT resource requirements, resources are provisioned as required.

As the deployment of virtualized IT resources in corporate and enterprise environments is rapidly increasing, existing methods of allocating IT resources from a high level become increasingly ineffective. Allocating resources to the enterprise's organizational units and subunits in a way that is consistent with the enterprise's high level goals is a difficult and arduous task, particularly when allocating virtualized IT resources. A high level virtualize IT resource allocation it difficult to monitor and manage; a count of physical machines is not an accurate measure of virtualized IT resource usage. So, what is needed is a system and method for allocating an enterprise's virtualized IT resources that aligns high-level enterprise priorities with the allocation of virtualized resources to the enterprise's organizational units and organizational subunits.

SUMMARY

A computer implemented system and method, and a computer program product, for allocating virtualized information technology resources across an enterprise. For example, a method may include accessing hierarchical enterprise information, which is information identifying a plurality of hierarchically arranged organizational units of the enterprise. The method accesses virtualized resource information, which is information identifying virtualized resources available to the enterprise. The method also accesses virtualized resource allocation information, which is information identifying one or more of the plurality of hierarchically arranged organizational units and information identifying one or more virtualized resources allocated to each of the identified one or more of the plurality of hierarchically arranged organizational units. The method may receive a virtualized resources request from one of the plurality of hierarchically arranged organizational units, which identifies one or more virtualized resources requested by the one of the plurality of hierarchically arranged organizational units. Responsive to receiving the virtualized resources request, the method determines whether provisioning each of the virtualized resources identified in the virtualized resources request does not exceed the virtualized resources allocated to the one of the plurality of hierarchically arranged organizational units from which the virtualized resource request was received. If not, the method causes the provisioning each of the virtualized resources identified in the virtualized resources request to the one of the plurality of hierarchically arranged organizational units from which the virtualized resource request was received.

It will be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

Some exemplary embodiments of the system and method, and computer program product, for allocating an enterprise's virtualized resources leverages existing infrastructure authentication services, such as, Active Directory and Lightweight Directory Access Protocol (LDAP). They do so by combining all the available virtualized resources within the enterprise's converged infrastructure into pools via a converged orchestration layer. Each pool may comprise processing, memory, network and storage resources. After combining the enterprise's virtualized resources, each pool is made available for use by an allocating entity, which is an entity or person that is positioned at the top of an enterprise's organization chart, such as a chief executive officer ("CEO") or the board of directors, for example. At the beginning of a time period, such as a calendar quarter, a decision may be made as to how to deploy an enterprise's virtualized resources. For example, a CEO may determine for the next calendar quarter, 60% of virtualized resources will be allocated to business development, 20% will be allocated to research and development, 10% will be allocated to sales and the remaining 10% will be allocated to infrastructure, i.e., IT operations.

The allocating entity, e.g., a CEO or board of directors, allocates a portion of the enterprise's processing, memory, network and storage resources by assigning a percentage of the total available processing, memory, network and storage resources to one or more of the enterprise's functional departments. The percentage of resources signed to a functional department will correspond to the enterprise's goals for that department. The resources represented by the percentage assigned to a functional department or organizational unit, therefore, becomes an upper limit for resource usage for that functional department or organizational unit. In some exemplary embodiments, information about an upper limit for a department's allocated virtualized resources may be stored in an Active Directory that for department. Thus, the total virtualized resources used by a department cannot exceed the amount of resources represented by the assigned percentage. Such limits on resources can be enforced via an orchestration layer. In some exemplary embodiments, if a department does use more virtualized resources than it was allocated, senior management personnel may be notified.

The assignment of virtualized resources may be repeated for each organizational level of an enterprise or a department of an enterprise until each individual team or individual user has been allocated virtualized resources. As may be appreciated, the allocation of resources may be as granular as the enterprise deems necessary.

In some exemplary embodiments, the system and method of allocating virtualized resources may be self-tuning. In addition, relative resource weights can be assigned to each department or organization unit to ensure that the correct proportion of processing, memory, network and storage resources are allocated and made available to a department to ensure, for example, that sufficient resources are available for running a department's mission critical applications.

Thus, the system and method of the present invention replaces the unidirectional approach of prior art systems and a method discussed above with a bidirectional system. This allows visibility of resources from a senior management perspective and enforces virtualized resource allocation on an organizational unit level. It also gives upper management visibility into a virtualized resource allocation, and allows close alignment of resource allocation and enterprise goals.

Figure 1:
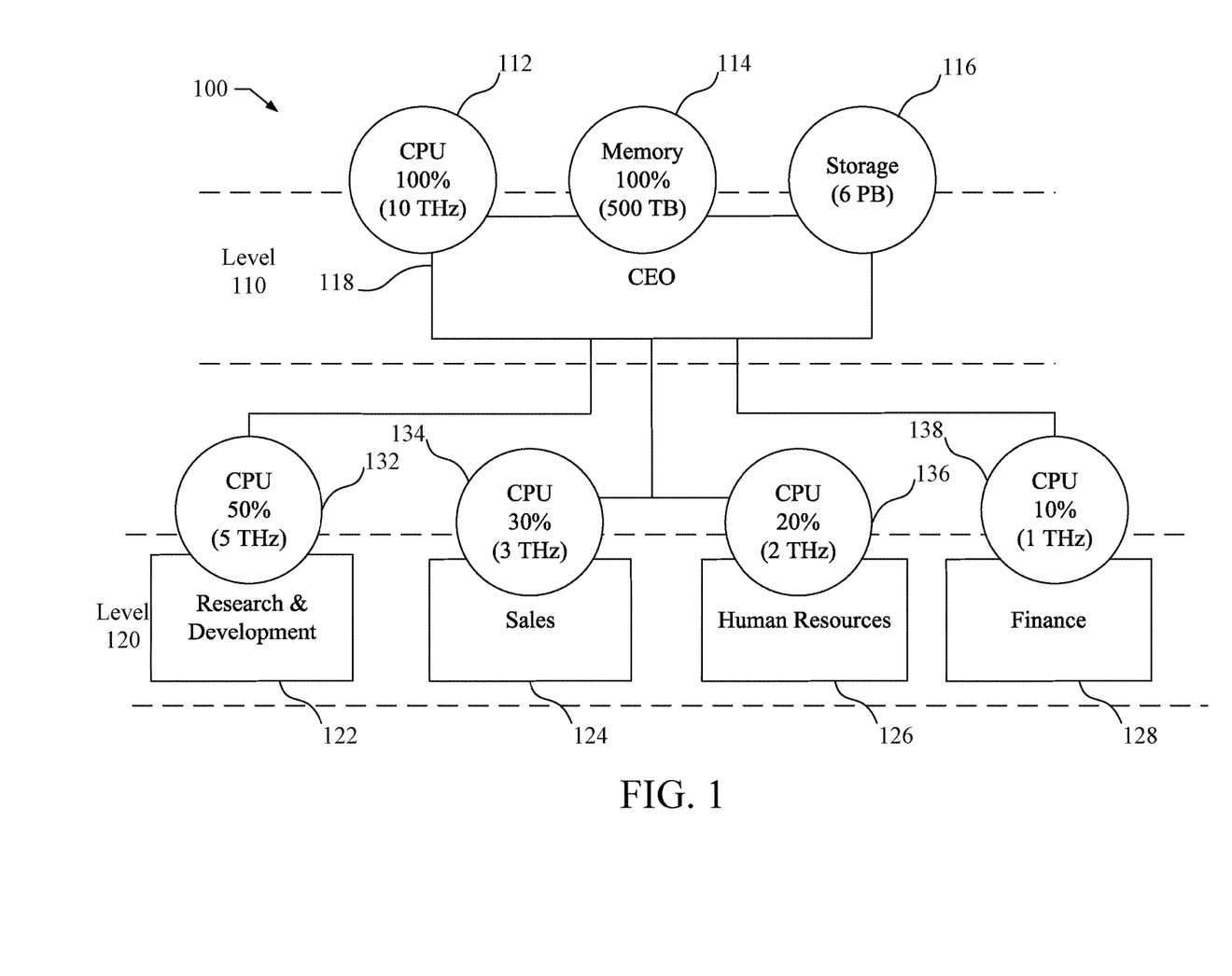
FIG. 1 is a diagram of an organizational chart for an enterprise, allocating virtualized resources across functional departments of the enterprise, according to some exemplary embodiments.

FIG. 1 is a diagram 100 of an organizational chart for an enterprise, illustrating an exemplary allocation of virtualized resources across functional departments of the enterprise. As shown in FIG. 1, the total virtualized resources available to an enterprise are shown in the level 110, which is the uppermost level of the organization chart. For example, an enterprise may have a total of 10 THz of central processing unit (CPU) capacity 112, 500 terabytes (TB) of memory 114 and 6 petabytes (PB) of storage 116 available for allocation among the enterprise's functional departments. In some example embodiments, a CEO 118 may be responsible for allocating the enterprise's resources among its functional departments.

In some example embodiments, the total virtualized resources available to an enterprise may be determined and reported by an orchestration layer. As may be appreciated, "orchestration" describes the automated arrangement, coordination, and management of complex computer systems, middleware and services. Orchestration can be used to define the policies and service levels through automated workflows, provisioning, and change of management. Orchestration also provides centralized management of virtualized resources, including billing, metering, and chargeback for consumption.

The enterprise's functional departments are illustrated in level 120, which is the next level of the organization chart. For example, an enterprise's functional departments may include Research and Development (R&D) 122, Sales 124, Human Resources (HR) 126 and Finance 128. As shown in FIG. 1, CPU resources are shown as being allocated to functional departments as follows: 50% or 5 THz 132 is allocated to the Research & Development department 122, 30% or 3 THz 134 is allocated to the Sales department 124, 20% or 2 THz 136 is allocated to the Human Resources department 126, and 00% or 1 THz 138 is allocated to the Finance department 128. As may be appreciated, each type of virtualized resource, e.g., CPU, memory, storage and network resources, can be allocated among the functional departments of an enterprise. However, for purposes of clarity, FIG. 1 only illustrates the allocation of CPU resources among the functional departments.

Figure 2:
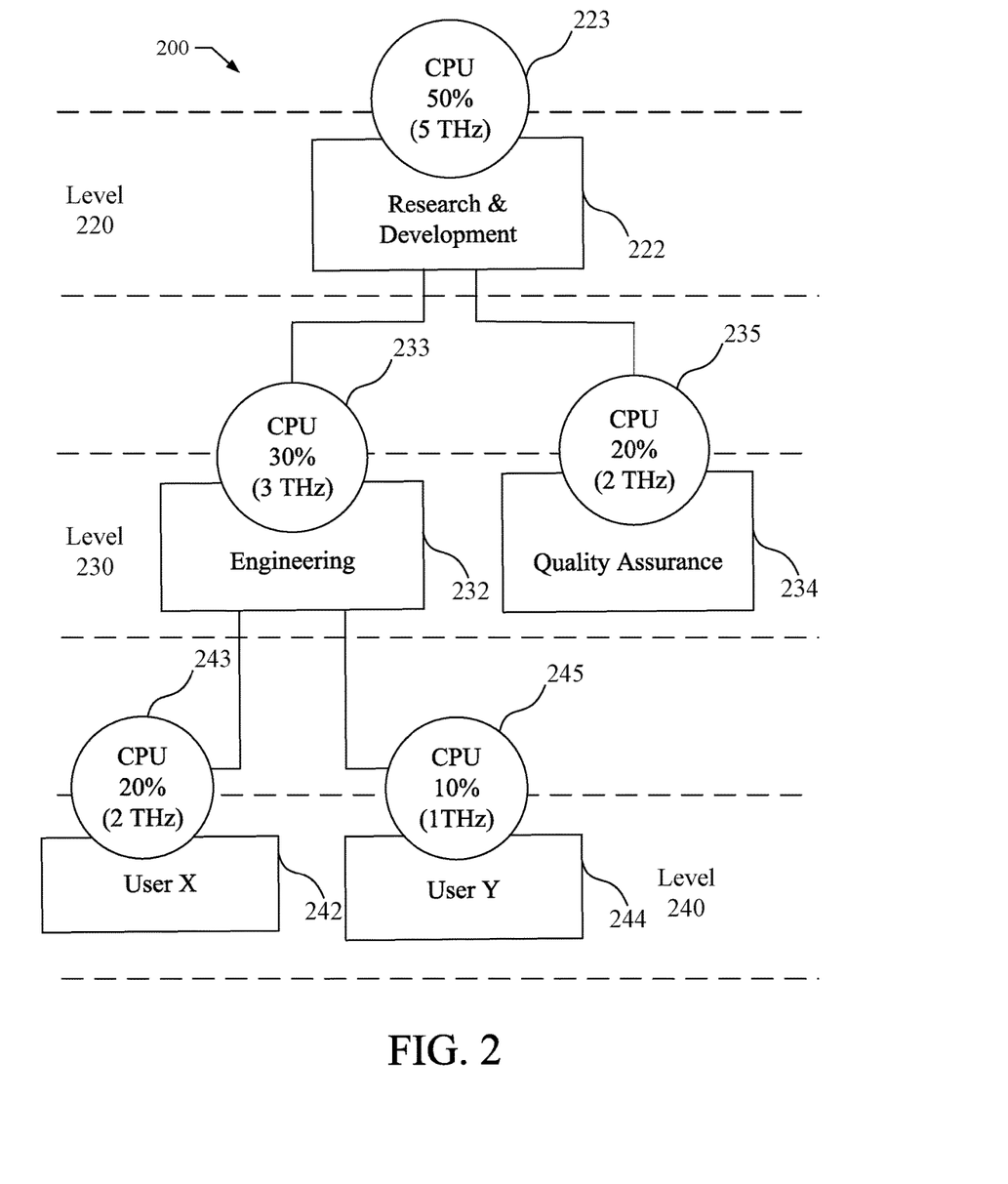
FIG. 2 is a diagram of an organizational chart for a functional department of the enterprise, allocating virtualized resources across the units and subunits of the functional department, according to some exemplary embodiments.

FIG. 2 is a diagram of an organizational chart for a functional department of the enterprise, allocating virtualized resources across the units and subunits of the functional department, according to some exemplary embodiments. FIG. 2 illustrates an exemplary embodiment where CPU resources are allocated among the organizational units and subunits of an R&D Department 122 shown in FIG. 1. As shown in FIG. 1, the R&D Department 122 is allocated 50% or 5 THz of the enterprise's total CPU resources. Again, as may be appreciated, each type of virtualized resource, e.g., CPU, memory, storage and network resources can be allocated among the organizational units and subunits of a functional department. However, for purposes of clarity, FIG. 2 only illustrates the allocation of CPU resources among the organizational units and subunits of the functional department.

As can be seen from FIG. 2, CPU resources are allocated among the various hierarchically arranged organizational units and subunits of the functional department, which in the illustrated example is the R&D Department 122 shown in FIG. 1.

Continuing with FIG. 2, the total CPU resources available to a functional department are shown in level 220, which is the uppermost level of the organization chart for the functional department. In the example illustrated by FIG. 2, 50% or 5 THz 223 of the enterprise's total CPU resources have been allocated to the R&D department 222.

The organizational units and subunits of organization department 222 are shown in Levels 230 and 240. As shown in FIG. 2, level 230 includes the Engineering organization 232, which has been allocated 30% or 3 THz 233 of the enterprise's total CPU resources, and the Quality Assurance organization 234, which has been allocated 20% or 2 THz 235 of the enterprise's total CPU resources. While the resources allocated to the organizational units and subunits may be expressed in terms of the enterprise's total resources, the invention is not so limited and the resources allocated to the organizational units and subunits may also be expressed in terms of the total resources allocated to the functional department.

Still referring to FIG. 2, level 240 includes two individual users, User X 242 and User Y 244. As may be appreciated, the invention is not limited to the number or type of organizational levels and organizational units and subunits. As shown if FIG. 2, User X 242 has been allocated 20% or 2 THz 243 of the enterprise's CPU resources and User Y 244 has been allocated 10% or 1 THz 245 of the enterprise's CPU resources. In some example embodiments, the lowest organizational level to which resources should be able to be allocated is a user level.

Figure 3:
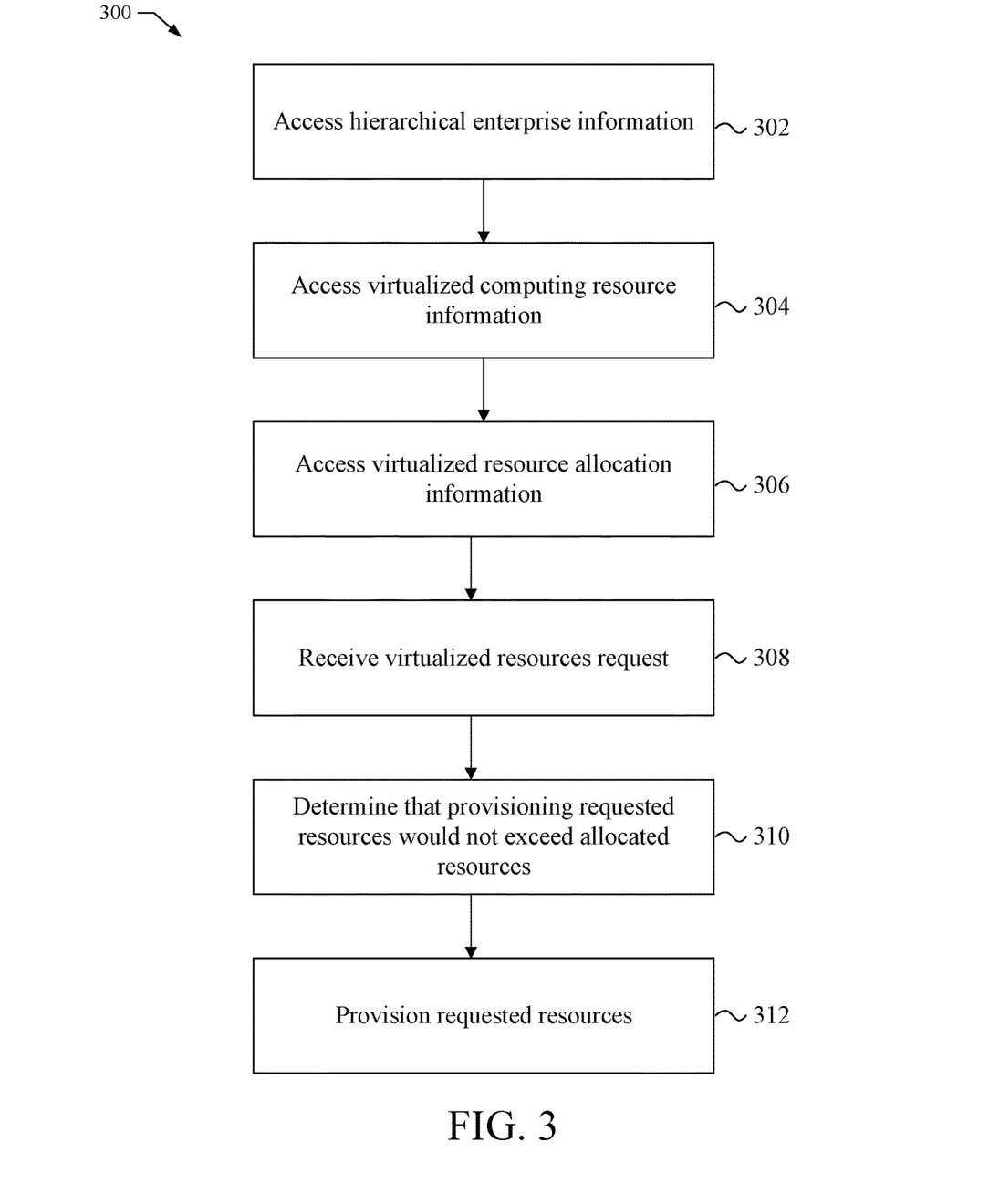
FIG. 3 is a flow diagram for a process for allocating virtualized resources across an enterprise, in accordance with some embodiments.

FIG. 3 is a flow diagram for a process 300 for allocating virtualized resources across an enterprise, in accordance with some embodiments. As shown in FIG. 3, in operation 302 process 300 accesses hierarchical enterprise information. Hierarchical enterprise information is information that identifies a plurality of hierarchically arranged organizational units of the enterprise.

In operation 304, process 300 accesses virtualized resource information. Virtualized computing resource information is comprised of information identifying virtualized resources available to the enterprise.

In some exemplary embodiments, virtualized resource information may be comprised of virtualized resource pool information, which identifies one or more pools of virtualized resources, and allocates virtualized resource pools to the hierarchically arranged organizational units. In such embodiments, responsive to receiving the virtualized resources request, process 300 determines whether provisioning each of the virtualized resources would exceed the virtualized resources comprising the pool of virtualized resources allocated to the organizational unit from which the virtualized resources request was received. If process 300 determines that it would not, process 300 causes the each of the pool of virtualized resources identified in the virtualized resources request to be made available to the hierarchically arranged organizational unit from which the virtualized resources request was received.

Returning to FIG. 3, in operation 306, process 300 accesses virtualized resource allocation information, wherein the virtualized resource allocation information is comprised of information identifying one or more of the plurality of hierarchically arranged organizational units and information identifying one or more virtualized resources allocated to each of the identified one or more of the plurality of hierarchically arranged organizational units. As may be appreciated, the invention is not necessarily limited to the sequence of operations 302, 304 and 306.

In operation 308, process 300 receives a virtualized resources request from one of the plurality of hierarchically arranged organizational units. The virtualized resources request is comprised of information identifying one or more virtualized resources requested by the one of the plurality of hierarchically arranged organizational units.

In operation 310, responsive to receiving the virtualized resources request, process 300 determines whether provisioning each of the virtualized resources identified in the virtualized resources request will exceed the virtualized resources allocated to the one of the plurality of hierarchically arranged organizational units from which the virtualized resource request was received.

In operation 312, process 300 provisions each of the virtualized resources identified in the virtualized resources request to one of the plurality of hierarchically arranged organizational units from, which the virtualized resource request was received.

In some exemplary embodiments, process 300, authenticate the plurality of hierarchically arranged organizational units via a directory service. As may be appreciated, directory services, such as Active Directory, which is available from Microsoft Corporation of Redmond, may be used to provide the authentication services.

In some example embodiments, hierarchical enterprise information may include information identifying a plurality of allocable organizational units. An allocable organizational unit is a unit at the highest level of the hierarchical enterprise to which virtualized resources are allocated, a functional department, for example. Hierarchical enterprise information also may include information associating each of the plurality of hierarchically arranged organizational units with one of the plurality of allocable organizational units. In such embodiments, the virtualized resource allocation information is comprised of information identifying each of the plurality of allocable organizational units and information identifying one or more virtualized resources allocated to each of the plurality of allocable organizational units. In such embodiments, process 300 also may include receiving a virtualized resources request from one of the plurality of hierarchically arranged organizational units, which identifies one or more virtualized resources requested by the one of the plurality of hierarchically arranged organizational units. Responsive to receiving the virtualized resources request, process 300 can also include determining whether provisioning each of the virtualized resources identified in the virtualized resources request would exceed the virtualized resources allocated to the allocable organizational unit with the hierarchically arranged organizational units is associated. If process 300 determines that it would not, each of the virtualized computer resources identified in the virtualized resources request is provisioned to the one of the plurality of hierarchically arranged organizational units from which the virtualized resources request was received.

Figure 4:
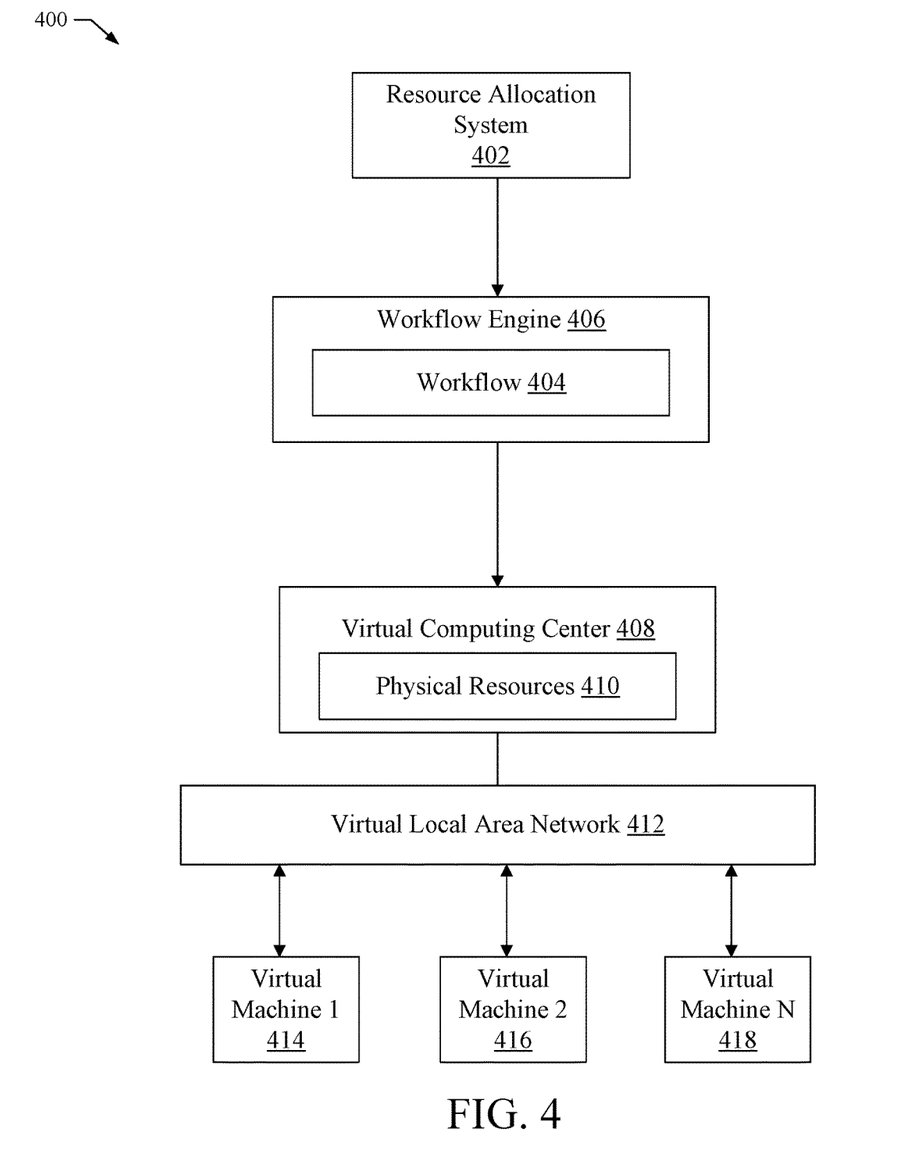
FIG. 4 is a block diagram of an application for allocating virtualized resources across an enterprise implemented via an orchestration layer, in accordance with some embodiments.

As discussed above, in some exemplary embodiments, the above described system and method for allocating virtualized resources across an enterprise may be implemented using an orchestration workflow engine. FIG. 4 is a block diagram illustrating a resource allocation system 402 invoking an orchestration workflow 404 to execute on an orchestration workflow engine 406, in accordance with some embodiments. The resource allocation system 402 can be implemented as a layer of software that handles workflow execution requests. Physically, resource allocation system 402 can be implemented in a computer coupled to virtual computing center 408, or can be included in physical resources 410 of a virtual computing center 408, for example as software executing on a processor thereof. Workflow 404 could, for example, commission, provision or decommission one or more virtual machines 414, 416 and 418, via a virtual local area network (VLAN) 412, or other virtual or physical arrangement of the physical resources 410 available from the virtual computing center 408, as a service fulfillment process, for example. In some example embodiments, resource allocation system 402 and workflow engine 406 are implemented on the same server, which could be a physical computing resource or a virtual server implemented on physical computing resources. In other example embodiments, resource allocation system 402 and workflow engine 406 are implemented on different physical computing resources.

Figure 5:
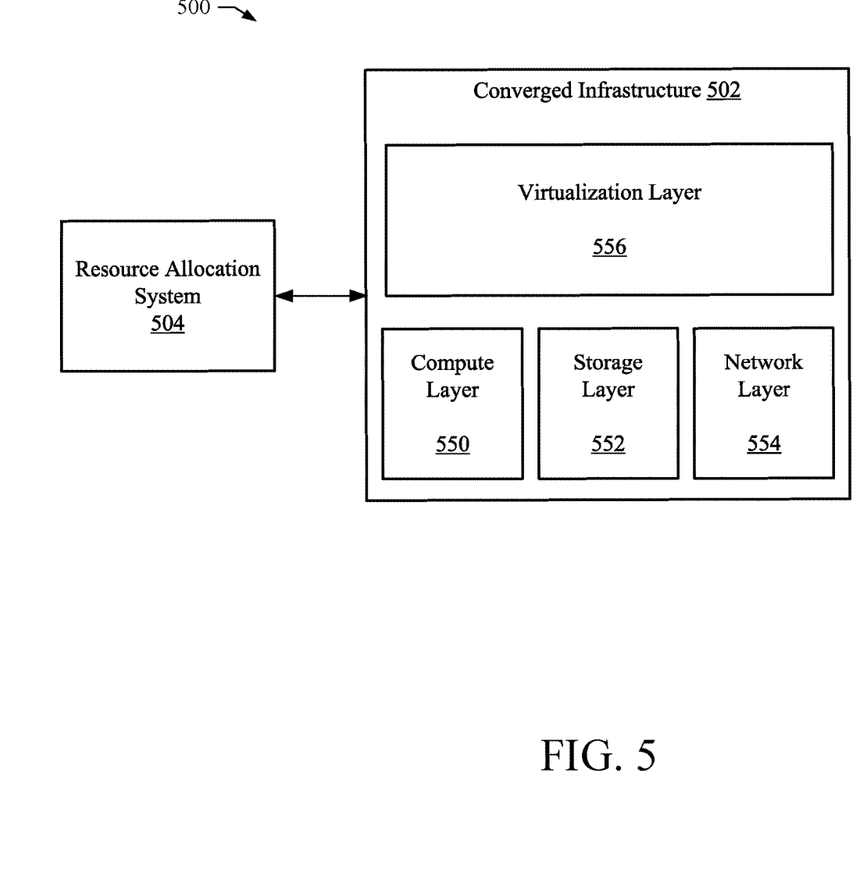
FIG. 5 is a diagram of a converged infrastructure environment, across which an enterprise's virtualized resources may be allocated, in accordance with some example embodiments.

Still referring to FIG. 4, resource allocation system 402 may generate a user interface for workflow inputs. This user interface can be in the form of HTML (hypertext markup language). Resource allocation system 402 may accept user inputs, validate the user inputs, and forwards the request to the workflow 404 resident in a workflow engine 406. Workflow engine 406 may be implemented on a virtual or physical computing device, e.g., a virtual server or a physical server, etc. Workflow 404 executes within work flow engine 406 and allocates physical resources 410 in virtual computing center 408. This execution allocates one or more virtual machines 414, 416, 418 and virtual local area network 412, in some embodiments. In some exemplary embodiments, the virtualized resources may be implemented via a converged infrastructure, a hyper converged infrastructure or a software container infrastructure. FIG. 5 is a diagram of a converged infrastructure environment, across which an enterprise's virtualized resources may be allocated, in accordance with some example embodiments. The environment 500 may include a converged infrastructure 502. The converged infrastructure 502 may include a plurality of components, such as servers, data storage devices, network equipment, and associated software. In some example embodiments, the converged infrastructure is implemented by a Vblock® System available from the VCE Company, LLC of Richardson, Tex.

By way of non-limiting example, in some embodiments, the converged infrastructure 502 for which a configuration may be determined may be a hyper-converged infrastructure. A hyper-converged infrastructure is characterized by a software-centric architecture that tightly integrates servers, data storage devices, network equipment, and associated software and virtualization resources, in a commodity hardware box supported by a single vendor. Hyper-convergence is related to the concept of converged infrastructure, which is an infrastructure approach where a single vendor provides a pre-configured bundle of hardware and software in a single chassis with the goal of minimizing compatibility issues and simplifying management. If required, however, the hardware components of a converged infrastructure can be separated and used independently. The hardware components in a hyper-converged infrastructure, however, are so integrated that they typically cannot be separated. In some example embodiments the hyper-converged infrastructure is implemented by a VxRack™ System, available from the VCE Company, LLC of Richardson, Tex.

The converged infrastructure 502 of some embodiments may include one or more compute layer 550 components, such as one or more servers (e.g., blade servers, rack servers, and/or other servers), one or more fabric extenders, one or more fabric interconnects, a chassis, and/or other compute layer components that may be implemented on a converged infrastructure to provide computing and processing resources of the converged infrastructure. The converged infrastructure 502 may further include one or more storage layer 552 components, such as one or more storage arrays and/or other mass storage devices that may be implemented on a converged infrastructure 502. In some embodiments, the converged infrastructure 502 may additionally include one or more network layer 554 components, such as one or more switches and/or other network layer components that may be implemented on a converged infrastructure. For example, the network layer 554 may include components that provide switching and routing between the compute layer 550 and storage layer 552 within the converged infrastructure 502. The network layer 554 may additionally or alternatively include components that provide switching and routing between the converged infrastructure 502 and a network so as to support network communication between a component(s) of the converged infrastructure 502 and a computing platform(s) independent of the converged infrastructure 502. The components of the compute layer 550, storage layer 552, and network layer 554 may collectively provide a physical infrastructure of the converged infrastructure 502.

The converged infrastructure 502 may additionally include a virtualization layer 556, which may include one or more virtualization components configured to support one or more virtualized computing environments. The components of the virtualization layer 556 may include components embodied in software, hardware, firmware, and/or some combination thereof. For example, the virtualization layer 556 may include a hypervisor and/or other virtualization components that may be configured to create and run virtual machines and/or to otherwise virtually simulate a computing environment. In some example embodiments, the virtualization layer 556 may include and/or may be communicatively coupled with one or more management components configured to support management of the converged infrastructure 502. For example, in some embodiments, the virtualization layer 556 may include a management infrastructure, which may provide management resources for managing the converged infrastructure 502. In some such embodiments, the management infrastructure may be a separate system from the converged infrastructure, but may be connected to the converged infrastructure to allow management of the entire converged infrastructure 502. In some example embodiments, the virtualization layer 556 may utilize physical hardware resources of the compute layer 550, storage layer 552, and/or network layer 554 to support operation of one or more components of the virtualization layer 556. Additionally or alternatively, in some example embodiments, the virtualization layer 556 may include dedicated physical resources (e.g., physical hardware components) that may provide computing, storage, and/or network communication resources to one or more components of the virtualization layer 556.

It will be appreciated that the compute layer 550, storage layer 552, network layer 554, and virtualization layer 556 as illustrated in FIG. 5 and described above are provided by way of example, and not by way of limitation. In this regard, in some embodiments, aspects of the compute layer 550, storage layer 552, network layer 554, and virtualization layer 556 as described above may not be mandatory and thus some may be omitted in certain embodiments. Additionally, the converged infrastructure 502 of some embodiments may include further or different layers and/or components beyond those illustrated in and described with respect to FIG. 5.

Physical components of the converged infrastructure 502 may be communicatively coupled with each other to support operation of the converged infrastructure 502 via direct connection and/or network communication. For example, as discussed above, in some example embodiments, the network layer 554 may provide switching and routing between physical components of the converged infrastructure.

In some embodiments at least a portion of the components of the converged infrastructure 502 may be assigned addresses, such as Internet Protocol (IP) addresses and/or other network layer addresses, via which the components may be accessed by another component internal to the converged infrastructure 502 and/or via a computing device external to the converged infrastructure 502. For example, in some example embodiments, the converged infrastructure 502 and/or one or more network addressable components thereof may be accessed by an external computing device over a network to which the converged infrastructure 502 of some embodiments may be connected.

FIG. 5 also shows a resource allocation system 504, which may be used to allocate an enterprise's virtualized resources implemented via a converged infrastructure, in accordance with some example embodiments. A sample embodiment of the resource allocation system 504 is illustrated in more detail in FIGS. 1-3 and is discussed in more detail in the discussion of FIGS. 1-3 above.

Figure 6:
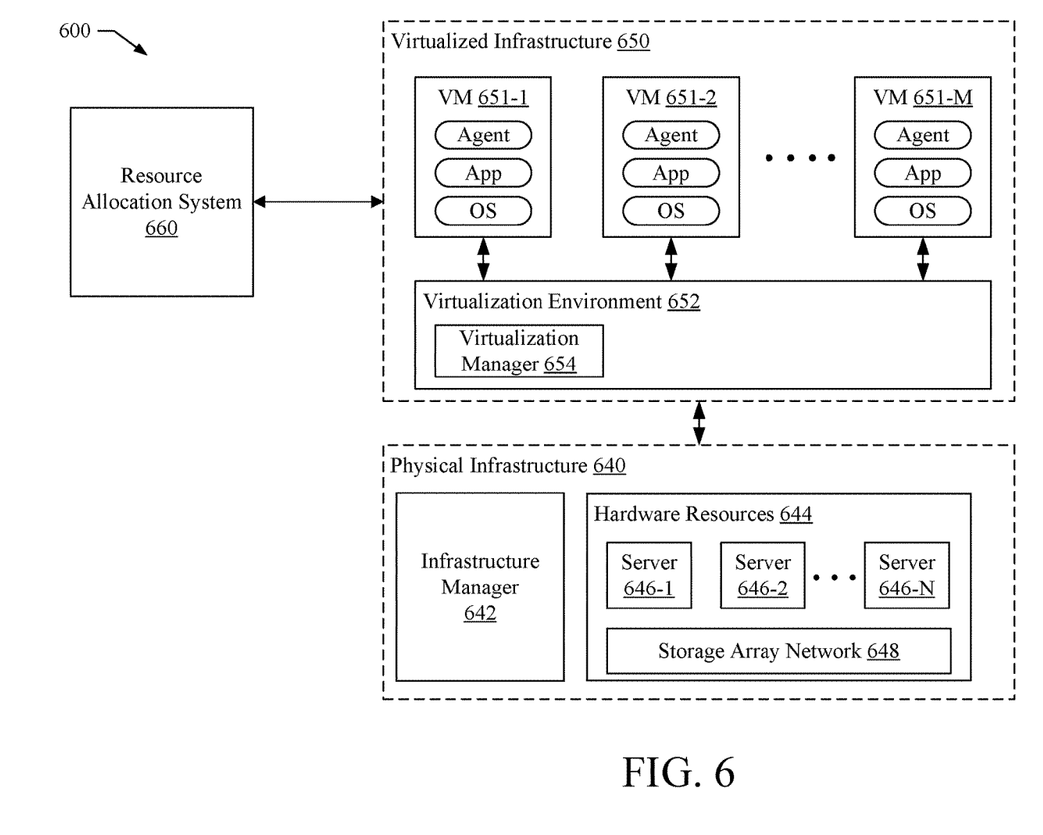
FIG. 6 is a diagram of a machine-level virtualization environment, the resources of which may be allocated across an enterprise, in accordance with some example embodiments.

FIG. 6 is a diagram of a machine-level virtualization environment 600, in which a resource allocation system may be deployed, in accordance with some example embodiments. It will be appreciated that the components and associated architecture illustrated in and described with respect to FIG. 6 are provided by way of example, and not by way of limitation. In this regard, components illustrated in FIG. 6 and described further below may not be mandatory and thus some may be omitted in certain embodiments. Additionally, some embodiments may include further or different components, beyond those illustrated in and described with respect to FIG. 6. Further, it will be appreciated that converged infrastructures within the scope of the disclosure may implement architectures other than that illustrated in and described with respect to FIG. 6.

The machine-level virtualization environment 600 may include a physical infrastructure 640 configured to support a virtualized infrastructure 650. In some example embodiments, the physical infrastructure 640 may include hardware resources 644, such as servers 646-1 to 646-N (sometimes referred to as "hosts") and one or more storage array networks (SAN), such as SAN 648, which may be communicatively connected by a network (not shown). The physical infrastructure 640, including hardware resources 644 may, for example, provide an embodiment of the compute layer 550, storage layer 552, and network layer 554. For example, the servers 646 may comprise an implementation of the compute layer 550, and the SAN 648 may comprise an implementation of the storage layer 552. The hardware resources 644, including, for example, the servers 646 and SAN 648 may be communicatively connected by an embodiment of the network layer 554.

In some example embodiments, the physical infrastructure 640 may be organized into a "computing-block" based infrastructure, wherein physical infrastructure units may be characterized by repeatable units of construction having similar performance, operational characteristics, and discrete requirements of power, space, and cooling that facilitate rapid deployment, integration, and scalability. The computing-block based infrastructure may be configured to dynamically provision hardware resources based on performance demands placed on the physical infrastructure 640. One such example of physical infrastructure 640 is a Vblock® system available from the VCE Company, LLC.

The physical infrastructure 640 may further include an infrastructure manager 642 configured to manage the configuration, provisioning, and policy compliance of the physical infrastructure 640. Infrastructure manager 642 may be configured to provide an interface by which provisioning of hardware resources 644 (e.g., computing, networking, storage) may be managed with policy-based automation. According to some embodiments, the infrastructure manager 642 may be included in every physical infrastructure 640 to manage the configuration, provisioning, and compliance of computing-block based infrastructure. As described in further detail below, the virtualized infrastructure 650 (or component thereof) of some example embodiments may be configured to connect to and communicate with the infrastructure manager 642 to manage and/or configure the physical infrastructure 640 to support operation of components of the virtualized infrastructure 650. One example of an infrastructure manager 642 includes EMC Ionix Unified Infrastructure Manager (UIM) available from EMC Corporation. In some embodiments, the infrastructure manager 642 may further be configured to provide network manager functionality such that the infrastructure manager 642 may be configured to configure network devices (e.g., switches, routers) and manage addressing, subnets, virtual local area networks (VLANs), and/or other network configurations that may be implemented on the converged infrastructure 602. One example of a network manager that may be included on the infrastructure manager 642 of such embodiments is a Cisco Switch, such as may be accessible via a Cisco IOS® command line interface (CLI), available from Cisco System, Inc.

The virtualized infrastructure 650 may include a virtualization environment 652 comprising one or more virtual machines (VM) 651, such as VM 651-1 to VM 651-M. Each virtual machine 651 can have an operating system (OS), one or more applications (APP) and an agent (AGENT). In some embodiments, one or more of the virtual machines 651 may be configured to connect to one or more users by a communications network, such as the Internet. The virtualized infrastructure 650 may, for example, comprise an embodiment of at least a portion of the virtualization layer 656.

The virtualization environment 652 may accordingly be configured to simulate (e.g., to virtualize) conventional components of a computing device, such as a processor, system memory, a hard disk drive, and/or the like for executing the VMs 651. For example, each VM 651 may include a virtual processor and a virtual system memory configured to execute an application. Thus, for example, the converged infrastructure 502 of some example embodiments may be configured to perform physical-to-virtual conversion of hardware resources 644 and/or other physical computing of the physical infrastructure 640 to support or host virtual machines 651 in the virtualized infrastructure 650. In this regard, components of the physical infrastructure 640 may include physical components, such as physical servers and/or other computing devices, memories, buses, networks, and/or other physical components, which may collectively support the virtualized infrastructure 650 and VMs 651.

A virtualization manager 654 of the virtualization environment 652 may be configured to establish and oversee the VMs 651. The virtualization manager 654 may be configured to dynamically allocate resources among the virtual machines 651. For example, in some embodiments, the virtualization manger 654 may be configured to communicate with the infrastructure manager 642 to manage and/or configure the physical infrastructure 640 to support operation of the virtual machines 651. The virtualization manager 654 of some example embodiments may be implemented with the VMware® vCenter® virtualized management platform available from VMware, Inc., of Palo Alto, Calif.

In some example embodiments, virtualization environment 652 may be implemented by running VMware vSphere® and/or VMware ESX®-based hypervisor technologies, available from Vmware, Inc., on servers 646. However, it will be appreciated that any virtualization/hypervisor/container technology may be used in addition to or in lieu of VMware hypervisor technologies in accordance with various example embodiments.

FIG. 6 also shows a resource allocation system 660, which may be configured to allocate an enterprise's virtual resources in a machine-level virtualization environment 650, in accordance with some example embodiments. A sample embodiment of the resource allocation system 660 is illustrated in more detail in FIGS. 1-3 and is discussed in more detail in the discussion of FIGS. 1-3 above.

As may be appreciated, rather than deploying a software application, for which resources need to be identified for deployment, in the machine-level virtualization environment 600 shown in FIG. 6, the software application may be deployed in an operating system-level virtualization environment, which is also known as a software container virtualized infrastructure. As also may be appreciated, operating system-level virtualization is a technique where the kernel of an operating system allows for multiple isolated user-space instances. These instances run on top of an existing host operating system and provide a set of libraries that applications interact with, giving them the appearance that they are running on a machine dedicated to their use. These instances are sometimes referred to as software containers and, thus, such an operating system-level virtualization environment may also be referred to as a software container virtualized infrastructure.

Figure 7:
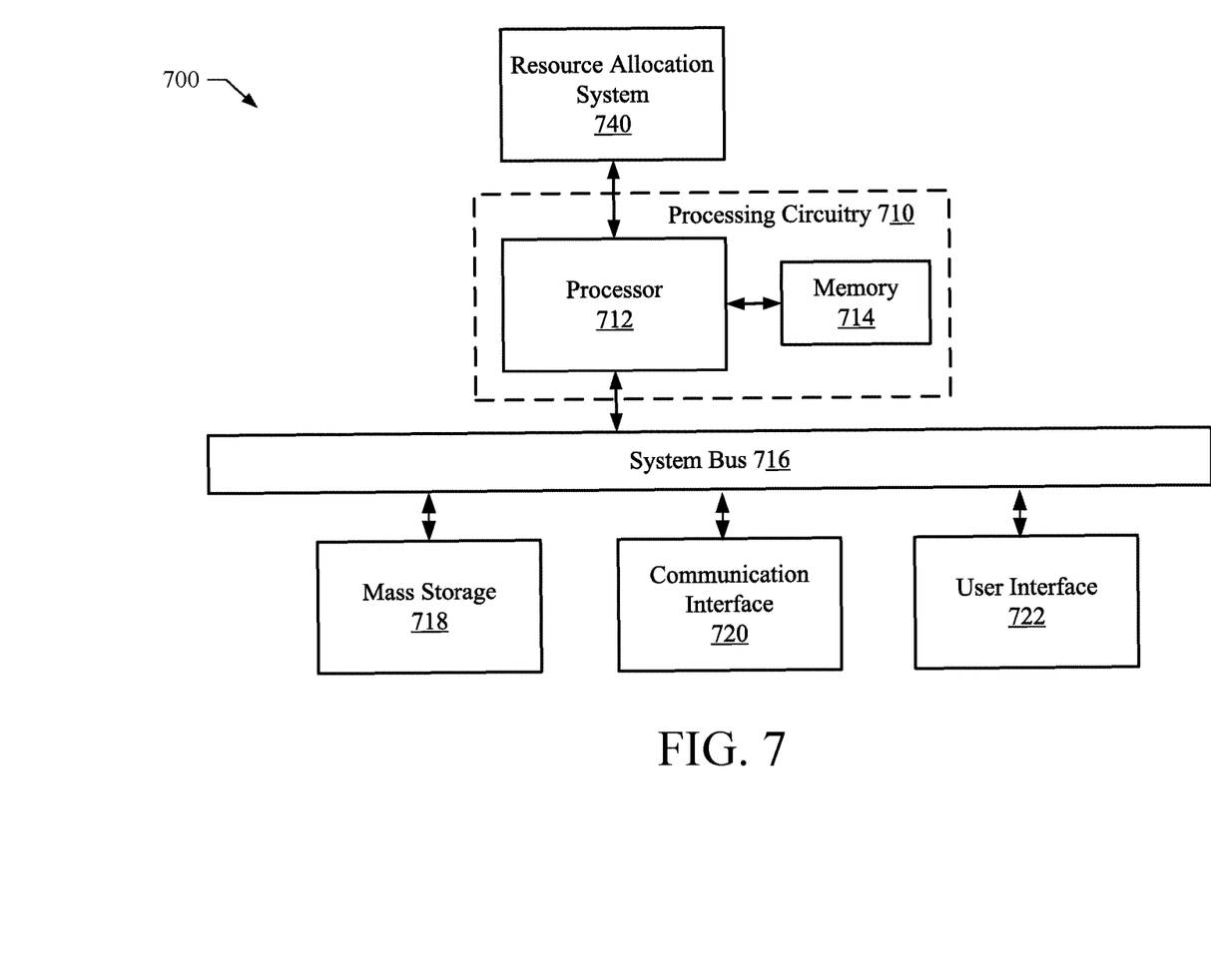
FIG. 7 is a block diagram of an exemplary computing device, which may implement the embodiments described herein.

FIG. 7 is a diagram of an example computing system 700 that may be used to implement some example embodiments of a resource allocation system. The computing system 700 may be implemented on any computing device or plurality of computing devices that may be configured to implement one or more example embodiments. By way of non-limiting example, in some embodiments, the computing system 700 may be implemented on a user terminal and/or a computing platform(s) of a converged infrastructure.

The computing system may include a plurality of elements, such as processing circuitry 710, mass storage 718, communication interface 720, and user interface 722, which may be interfaced via a system bus 716. It will be appreciated that the components, devices or elements illustrated in and described with respect to FIG. 7 below may not be mandatory and thus some may be omitted in certain embodiments. Additionally, the computing system 700 of some embodiments may include further or different components, devices or elements beyond those illustrated in and described with respect to FIG. 7.

Further, while FIG. 7 illustrates an architecture including elements interfaced via the system bus 716, it will be appreciated that in some example embodiments, elements of the computing system 700 may be implemented in a distributed computing environment in which elements may be distributed across a plurality of computing devices, which may be in communication with each other, such as via a network, to provide functionality of the computing system 700. As such, in some example embodiments, elements of the computing system 700 may be communicatively coupled via a network in addition to or in lieu of the system bus 716.

The computing system 700 of some example embodiments may implement an operating system(s), such as MICROSOFT WINDOWS™, UNIX™, LINUX™, IBM z/OS™, CISCO™ INTERNETWORK OPERATING SYSTEM™ (IOS), CISCO™ CATALYST™ OPERATING SYSTEM (CatOS), CISCO NX-OS, EMC™ ISILON OneFS™ OPERATING SYSTEM, NETAPP™ DATA ONTAP™, or other known operating systems. It should be appreciated; however, that in some embodiments, one or more aspects of the computing system 700 may be implemented on and/or integrated with a virtualized computing system, such as may be provided by a converged infrastructure.

In some example embodiments, the computing system 700 may include processing circuitry 710 that is configurable to perform actions in accordance with one or more example embodiments disclosed herein. In this regard, the processing circuitry 710 may be configured to perform and/or control performance of one or more functionalities for determining a configuration of a converged infrastructure, such as converged infrastructure, in accordance with various example embodiments. Thus, the processing circuitry 710 may be configured to perform data processing, application execution and/or other processing and management services according to one or more example embodiments.

In some example embodiments, the processing circuitry 710 may include a processor 712 and, in some embodiments, such as that illustrated in FIG. 7, may further include memory 714. The processing circuitry 710 may be in communication with (e.g., via system bus 716) and/or otherwise control mass storage 718, communication interface 720, and/or user interface 722.

The processor 712 may be embodied in a variety of forms. For example, the processor 712 may be embodied as various hardware processing means such as a microprocessor, a coprocessor, a general purpose processor, a controller or various other computing or processing devices including integrated circuits (e.g., a logic device), such as an ASIC (application specific integrated circuit), an FPGA (field programmable gate array), some combination thereof, or the like. Although illustrated as a single processor, it will be appreciated that the processor 712 may comprise a plurality of processors. The plurality of processors may be in operative communication with each other and may be collectively configured to perform one or more functionalities to support determination of a configuration of a converged infrastructure in accordance with various embodiments. In some embodiments in which the computing system 700 is embodied as a plurality of computing devices, a plurality of processors, which may collectively form the processor 712, may be distributed across a plurality of computing devices that may be in operative communication with each other directly and/or via a network. In some example embodiments, the processor 712 may be configured to execute instructions that may be stored in a memory, such as the memory 714 and/or the mass storage 718 and/or that may be otherwise accessible to the processor 712. As such, whether configured by hardware or by a combination of hardware and software, the processor 712 may be capable of performing operations according to various embodiments while configured accordingly.

In embodiments including the memory 714, the memory 714 may include read only memory (ROM), random access memory (RAM), and/or the like. The mass storage 718 may include one or more memory and/or other storage devices, which may include fixed (e.g., a fixed hard disc drive, storage array, fixed flash memory device, and/or the like) and/or removable memory devices (e.g., a removable flash memory device, an optical disc drive, and/or other removable memory device). The mass storage 718 may provide a persistent data storage device. In some example embodiments, the mass storage 718 may be configured to provide a backup storage. The mass storage 718 may include a memory device implemented locally to the computing system 700 and/or a memory device remote to the computing system 700, which may be communicatively coupled with the computing system 700, such as via a network. In some embodiments in which the computing system 700 is embodied as a plurality of computing devices, the memory 714 and/or mass storage 718 may include a plurality of memory devices, which may be distributed across a plurality of computing devices that may be in operative communication with each other directly and/or via a network to form the computing system 700.

In some embodiments, the memory 714 and/or the mass storage 718 may provide a non-transitory computer-readable storage medium that may store computer program instructions that may be executed by the processor 712. In this regard, the memory 714 and/or mass storage 718 may be configured to store information, data, applications, instructions and/or the like for enabling the computing system 700 to carry out various functions in accordance with one or more example embodiments. Applications that may be executed by the processor 712 may also be in the form of modulated electronic signals that may be accessed via a network modem or other network interface of the computing system 700.

The computing system 700 may further include a communication interface 720. The communication interface 720 may enable the computing system 700 to communicate (e.g., over a network or other communication interface) with another computing device or system, such as the converged infrastructure. In this regard, the communication interface 720 may include one or more interface mechanisms for enabling communication with other devices and/or networks. As such, the communication interface 720 may include, for example, an antenna (or multiple antennas) and supporting hardware and/or software for enabling communications with a wireless communication network (e.g., a cellular network, wireless local area network, and/or the like) and/or a communication modem or other hardware/software for supporting communication via cable, digital subscriber line (DSL), USB, FireWire, Ethernet, one or more optical transmission technologies, and/or other wireline networking methods.

In some example embodiments, the computing system 700 may include the user interface 722. It will be appreciated, however, that in some example embodiments, one or more aspects of the user interface 722 may be omitted, and in some embodiments, the user interface 722 may be omitted entirely. The user interface 722 may be in communication with the processing circuitry 710 to receive an indication of a user input and/or to provide an audible, visual, mechanical, or other output to a user. As such, the user interface 722 may include, for example, a keyboard, a mouse, a joystick, a display, a touch screen display, a microphone, a speaker, one or more biometric input devices, and/or other input/output mechanisms.

As shown in FIG. 7, in some example embodiments, a resource allocation system 740 interfaces with computing system 700. As discussed above in connection with FIG. 4, the resource allocation system 740 may be configured to allocated an enterprise's virtualized resources using an orchestration layer.

Embodiments described herein may be practiced with various computer system configurations including blade devices, cloud systems, converged infrastructure systems, rack mounted servers, switches, storage environments, hand-held devices, tablets, microprocessor systems, microprocessor-based or programmable consumer electronics, mini computers, mainframe computers and the like. Some embodiments may also be practiced in distributed computing environments where tasks are performed by remote processing devices that are linked through one or more networks, such as one or more wireline networks and/or one or more wireless networks.

A computer program product may be used to implement a test framework for orchestration workflows, in some example embodiments. A computer program product embodiment may include a machine-readable, non-transitory (non-volatile) storage medium (media) having instructions stored thereon/in, which can be used to program a computer to perform any of the processes of the embodiments described herein. Computer code for operating and configuring a test framework for orchestration workflows is preferably downloaded and stored on a hard disk, although the entire program code, or portions thereof, may also be stored in any other volatile or non-volatile memory medium or device as is well known, such as a read only memory (ROM) or random access memory (RAM), or provided on any media capable of storing program code, such as any type of rotating or solid state media, or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), local area network (LAN), etc.) using any communication medium and protocols (e.g., transmission control protocol/internet protocol (TCP/IP), hypertext transport protocol (HTTP), HTTP secure (HTTPS), Ethernet, etc.) as are well known. It may be appreciated that computer code for implementing embodiments of the present invention can be implemented in any programming language that can be executed on a client system and/or server or server system such as, for example, C, C++, hypertext markup language (HTML), any other markup language, Java™, JavaScript, ActiveX, any other scripting language, such as VBScript, and many other programming languages as are well known may be used.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A computer implemented method for allocating virtualized resources to a hierarchical enterprise, the method comprising:
   accessing hierarchical enterprise information, wherein the hierarchical enterprise information is comprised of information identifying a plurality of hierarchically arranged organizational units of the enterprise;
   accessing virtualized resource information, wherein the virtualized resource information is comprised of information identifying virtualized resources available to the enterprise;
   accessing virtualized resource allocation information, wherein the virtualized resource allocation information is comprised of information identifying one or more of the plurality of hierarchically arranged organizational units and information identifying one or more virtualized resources allocated to each of the identified one or more of the plurality of hierarchically arranged organizational units;
   receiving a virtualized resources request from one of the plurality of hierarchically arranged organizational units, wherein the computing resources request is comprised of information identifying a respective amount of one or more virtualized resources requested by the one of the plurality of hierarchically arranged organizational units;
   responsive to receiving the virtualized resources request, determining whether provisioning the respective amount of each of the virtualized resources identified in the virtualized resources request exceeds the virtualized resources allocated to the one of the plurality of hierarchically arranged organizational units from which the virtualized resource request was received; and
   upon determining that provisioning the respective amount of each of the virtualized resources identified in the virtualized resources request does not exceed the virtualized resources allocated to the one of the plurality of hierarchically arranged organizational units, provisioning the respective amount of each of the virtualized resources identified in the virtualized resources request to the one of the plurality of hierarchically arranged organizational units from which the virtualized resource request was received.

2. The method of claim 1, wherein the virtualized resource information is comprised of virtualized resource pool information,
   wherein the virtualized resource pool information is comprised of information identifying one or more pools of virtualized resources, and
   wherein the virtualized resource allocation information is comprised of information identifying one or more virtualized resource pools allocated to each of the identified one or more of the plurality of hierarchically arranged organizational units,
   the method further comprising:
   responsive to receiving the virtualized resources request, determining whether provisioning the respective amount of each of the virtualized resources identified in the virtualized resources request exceeds the virtualized resources comprising the pool of virtualized resources allocated to the one of the plurality of hierarchically arranged organizational units from which the virtualized resources request was received; and
   upon determining that provisioning the respective amount of each of the virtualized resources identified in the virtualized resources request does not exceed the virtualized resources comprising the pool of virtualized resources allocated to the one of the plurality of hierarchically arranged organizational units, provisioning the respective amount of each of the pool of virtualized computer resources identified in the virtualized resources request to the one of the plurality of hierarchically arranged organizational units from which the virtualized resources request was received.

3. The method of claim 1, further comprising:
   authenticating the one of the plurality of hierarchically arranged organizational units via a directory service.

4. The method of claim 1, wherein the hierarchical enterprise information is further comprised of information identifying a plurality of allocable organizational units,
   wherein an allocable organizational unit is a unit at the highest level of the hierarchical enterprise to which virtualized resources are allocated and information associating each of the plurality of hierarchically arranged organizational units with one of the plurality of allocable organizational units; and
   wherein the virtualized resource allocation information is comprised of information identifying each of the plurality of allocable organizational units and information identifying one or more virtualized resources allocated to each of the plurality of allocable organizational units,
   the method further comprising:
   receiving a virtualized resources request from one of the plurality of hierarchically arranged organizational units, wherein the computing resources request is comprised of information identifying the respective amount of one or more virtualized resources requested by the one of the plurality of hierarchically arranged organizational units;
   responsive to receiving the virtualized resources request, determining whether provisioning the respective amount of each of the virtualized resources identified in the virtualized resources request exceeds the virtualized resources allocated to the allocable organizational unit associated with the one of the plurality of hierarchically arranged organizational units from which the resources request was received; and
   upon determining that provisioning the respective amount of each of the virtualized resources identified in the virtualized resources request does not exceed the virtualized resources allocated to the allocable organizational unit associated with the one of the plurality of hierarchically arranged organizational units, provisioning the respective amount of each of the virtualized computer resources identified in the virtualized resources request to the one of the plurality of hierarchically arranged organizational units from which the virtualized resources request was received.

5. The method of claim 1, wherein the step of determining whether provisioning the respective amount of each of the virtualized resources identified in the virtualized resources request exceeds the virtualized resources allocated to the one of the plurality of hierarchically arranged organizational units from which the virtualized resource request was received is performed by a workflow orchestration engine.

6. The method of claim 1, wherein the virtualized resources are implemented via a converged infrastructure, a hyper converged infrastructure or a software container infrastructure.

7. The method of claim 1, wherein the virtualized resources comprise CPU resources.

8. The method of claim 1, wherein the respective amount of one or more virtualized resources includes a respective percentage of a respective total amount of each of the one or more virtualized resources.

9. A computer implemented system for allocating virtualized resources to a hierarchical enterprise, the system comprising:
   at least one processor; and
   at least one memory storing computer program code, wherein the at least one memory and stored computer program code are configured, with the at least one processor, to cause the system to at least:
      access hierarchical enterprise information, wherein the hierarchical enterprise information is comprised of information identifying a plurality of hierarchically arranged organizational units of the enterprise;
      access virtualized resource information, wherein the virtualized resource information is comprised of information identifying virtualized resources available to the enterprise;
      access virtualized resource allocation information, wherein the virtualized resource allocation information is comprised of information identifying one or more of the plurality of hierarchically arranged organizational units and information identifying one or more virtualized resources allocated to each of the identified one or more of the plurality of hierarchically arranged organizational units;
      receive a virtualized resources request from one of the plurality of hierarchically arranged organizational units, wherein the computing resources request is comprised of information identifying a respective amount of one or more virtualized resources requested by the one of the plurality of hierarchically arranged organizational units;
      responsive to receiving the virtualized resources request, determine whether provisioning the respective amount of each of the virtualized resources identified in the virtualized resources request exceeds the virtualized resources allocated to the one of the plurality of hierarchically arranged organizational units from which the virtualized resource request was received; and
      upon determining that provisioning the respective amount of each of the virtualized resources identified in the virtualized resources request does not exceed the virtualized resources allocated to the one of the plurality of hierarchically arranged organizational units, provision the respective amount of each of the virtualized resources identified in the virtualized resources request to the one of the plurality of hierarchically arranged organizational units from which the virtualized resource request was received.

10. The system of claim 9, wherein the virtualized resource information is comprised of virtualized resource pool information,
   wherein the virtualized resource pool information is comprised of information identifying one or more pools of virtualized resources, and
   wherein the virtualized resource allocation information is comprised of information identifying one or more virtualized resource pools allocated to each of the identified one or more of the plurality of hierarchically arranged organizational units,
   wherein the at least one memory and stored computer program code are configured, with the at least one processor, to further cause the system to:
   responsive to receiving the virtualized resources request, determine whether provisioning the respective amount of each of the virtualized resources identified in the virtualized resources request exceeds the virtualized resources comprising the pool of virtualized resources allocated to the one of the plurality of hierarchically arranged organizational units from which the virtualized resources request was received; and
      upon determining that provisioning the respective amount of each of the virtualized resources identified in the virtualized resources request does not exceed the virtualized resources comprising the pool of virtualized resources allocated to the one of the plurality of hierarchically arranged organizational units, provision the respective amount of each of the pool of virtualized computer resources identified in the virtualized resources request to the one of the plurality of hierarchically arranged organizational units from which the virtualized resources request was received.

11. The system of claim 9, wherein the at least one memory and stored computer program code are configured, with the at least one processor, to further cause the system to:
   authenticate the one of the plurality of hierarchically arranged organizational units via a directory service.

12. The system of claim 9, wherein the hierarchical enterprise information is further comprised of information identifying a plurality of allocable organizational units,
   wherein an allocable organizational unit is a unit at the highest level of the hierarchical enterprise to which virtualized resources are allocated and information associating each of the plurality of hierarchically arranged organizational units with one of the plurality of allocable organizational units, and
   wherein the virtualized resource allocation information is comprised of information identifying each of the plurality of allocable organizational units and information identifying one or more virtualized resources allocated to each of the plurality of allocable organizational units,
   wherein the at least one memory and stored computer program code are configured, with the at least one processor, to further cause the system to:
   receive a virtualized resources request from one of the plurality of hierarchically arranged organizational units, wherein the computing resources request is comprised of information identifying the respective amount of one or more virtualized resources requested by the one of the plurality of hierarchically arranged organizational units;

responsive to receiving the virtualized resources request, determine whether provisioning the respective amount of each of the virtualized resources identified in the virtualized resources request exceeds the virtualized resources allocated to the allocable organizational unit associated with the one of the plurality of hierarchically arranged organizational units from which the resources request was received; and upon determining that provisioning the respective amount of each of the virtualized resources identified in the virtualized resources request does not exceed the virtualized resources allocated to the allocable organizational unit associated with the one of the plurality of hierarchically arranged organizational units, provision the respective amount of each of the virtualized computer resources identified in the virtualized resources request to the one of the plurality of hierarchically arranged organizational units from which the virtualized resources request was received.

13. The system of claim 9, wherein a workflow orchestration engine determines whether provisioning the respective amount of each of the virtualized resources identified in the virtualized resources request exceeds the virtualized resources allocated to the one of the plurality of hierarchically arranged organizational units from which the virtualized resource request was received.

14. The system of claim 9, wherein the virtualized resources are implemented via a converged infrastructure, a hyper converged infrastructure or a software container infrastructure.

15. A computer program product for allocating virtualized resources to a hierarchical enterprise, the computer program product comprising at least one non-transitory computer-readable storage medium having program instructions stored thereon, which when executed by at least one processor, cause the at least one processor to perform a method comprising:
    accessing hierarchical enterprise information, wherein the hierarchical enterprise information is comprised of information identifying a plurality of hierarchically arranged organizational units of the enterprise;
    accessing virtualized resource information, wherein the virtualized resource information is comprised of information identifying virtualized resources available to the enterprise;
    accessing virtualized resource allocation information, wherein the virtualized resource allocation information is comprised of information identifying one or more of the plurality of hierarchically arranged organizational units and information identifying one or more virtualized resources allocated to each of the identified one or more of the plurality of hierarchically arranged organizational units;
    receiving a virtualized resources request from one of the plurality of hierarchically arranged organizational units, wherein the computing resources request is comprised of information identifying a respective amount of one or more virtualized resources requested by the one of the plurality of hierarchically arranged organizational units;
    responsive to receiving the virtualized resources request, determining whether provisioning the respective amount of each of the virtualized resources identified in the virtualized resources request exceeds the virtualized resources allocated to the one of the plurality of hierarchically arranged organizational units from which the virtualized resource request was received; and
    upon determining that provisioning the respective amount of each of the virtualized resources identified in the virtualized resources request does not exceed the virtualized resources allocated to the one of the plurality of hierarchically arranged organizational units, provisioning the respective amount of each of the virtualized resources identified in the virtualized resources request to the one of the plurality of hierarchically arranged organizational units from which the virtualized resource request was received.

16. The computer program product of claim 15, wherein the virtualized resource information is comprised of virtualized resource pool information,
    wherein the virtualized resource pool information is comprised of information identifying one or more pools of virtualized resources, and
    wherein the virtualized resource allocation information is comprised of information identifying one or more virtualized resource pools allocated to each of the identified one or more of the plurality of hierarchically arranged organizational units,
    wherein the least one non-transitory computer-readable storage medium having program instructions stored thereon, which when executed by the at least one processor, cause the at least one processor to perform a method further comprising:
    responsive to receiving the virtualized resources request, determining whether provisioning the respective amount of each of the virtualized resources identified in the virtualized resources request exceeds the virtualized resources comprising the pool of virtualized resources allocated to the one of the plurality of hierarchically arranged organizational units from which the virtualized resources request was received; and
    upon determining that provisioning the respective amount of each of the virtualized resources identified in the virtualized resources request does not exceed the virtualized resources comprising the pool of virtualized resources allocated to the one of the plurality of hierarchically arranged organizational units, provisioning the respective amount of each of the pool of virtualized computer resources identified in the virtualized resources request to the one of the plurality of hierarchically arranged organizational units from which the virtualized resources request was received.

17. The computer program product of claim 15, wherein the least one non-transitory computer-readable storage medium having program instructions stored thereon, which when executed by the at least one processor, cause the at least one processor to perform a method further comprising:
    authenticating the one of the plurality of hierarchically arranged organizational units via a directory service.

18. The computer program product of claim 15, wherein the hierarchical enterprise information is further comprised of information identifying a plurality of allocable organizational units,
    wherein an allocable organizational unit is a unit at the highest level of the hierarchical enterprise to which virtualized resources are allocated and information associating each of the plurality of hierarchically arranged organizational units with one of the plurality of allocable organizational units, and wherein the virtualized resource allocation information is comprised of information identifying each of the plurality of allocable organizational units and information identifying one or more virtualized resources allocated to each of the plurality of allocable organizational units, wherein the least one non-transitory computer-readable storage medium having program instructions stored thereon, which when executed by the at least one processor, cause the at least one processor to perform a method further comprising:

receiving a virtualized resources request from one of the plurality of hierarchically arranged organizational units, wherein the computing resources request is comprised of information identifying the respective amount of one or more virtualized resources requested by the one of the plurality of hierarchically arranged organizational units;

responsive to receiving the virtualized resources request, determining whether provisioning the respective amount of each of the virtualized resources identified in the virtualized resources request exceeds the virtualized resources allocated to the allocable organizational unit associated with the one of the plurality of hierarchically arranged organizational units from which the resources request was received; and upon determining that provisioning the respective amount of each of the virtualized resources identified in the virtualized resources request does not exceed the virtualized resources allocated to the allocable organizational unit associated with the one of the plurality of hierarchically arranged organizational units, provisioning the respective amount of each of the virtualized computer resources identified in the virtualized resources request to the one of the plurality of hierarchically arranged organizational units from which the virtualized resources request was received.

19. The computer program product of claim 15, wherein determining whether provisioning the respective amount of each of the virtualized resources identified in the virtualized resources request exceeds the virtualized resources allocated to the one of the plurality of hierarchically arranged organizational units from which the virtualized resource request was received is performed by a workflow orchestration engine.

20. The computer program product of claim 15, wherein the virtualized resources are implemented via a converged infrastructure, a hyper converged infrastructure or a software container infrastructure.

* * * * *